3,230,475
STRUCTURE FOR INCREASING LIGHT
INTENSITY AT A DISTANT POINT
Charles J. Koester, South Woodstock, Conn., and Elias
Snitzer, Sturbridge, Mass., assignors to American
Optical Company, Southbridge, Mass., a voluntary
association of Massachusetts
Filed July 10, 1962, Ser. No. 208,750
11 Claims. (Cl. 331—94.5)

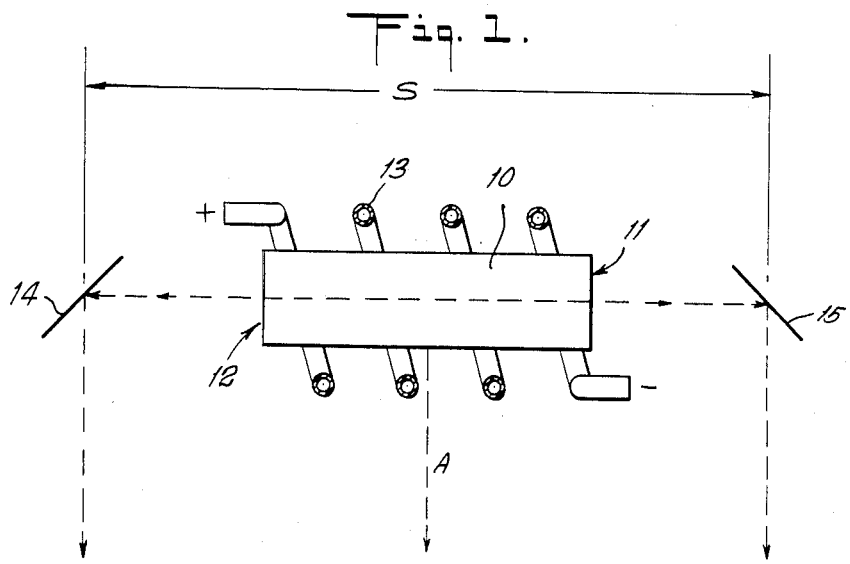
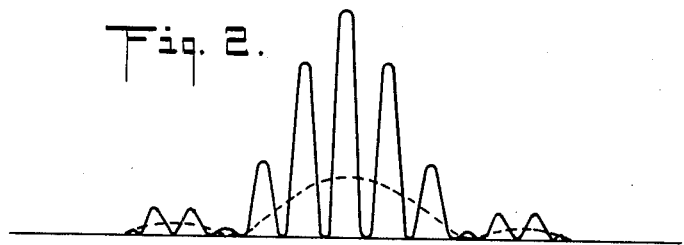
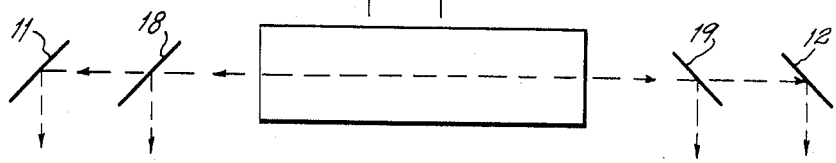
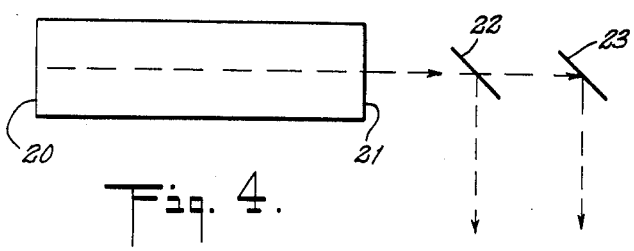

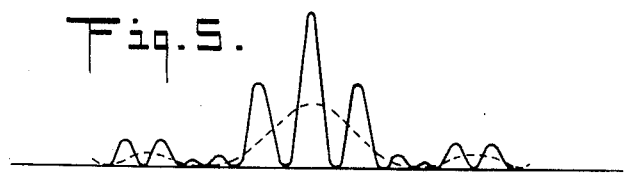
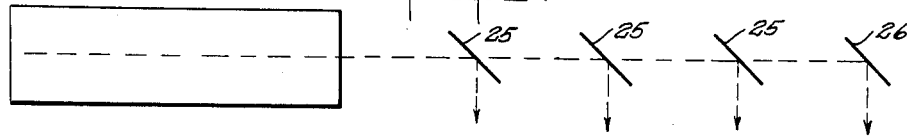
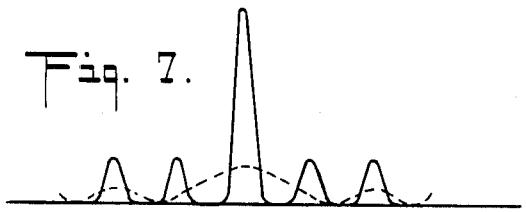
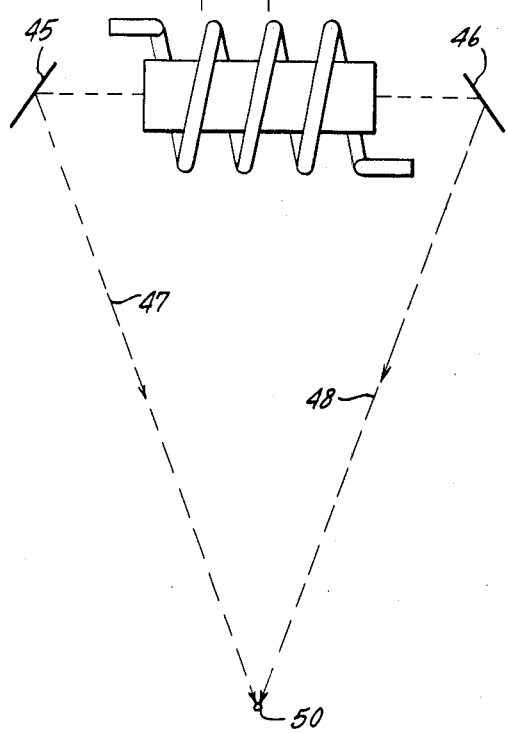
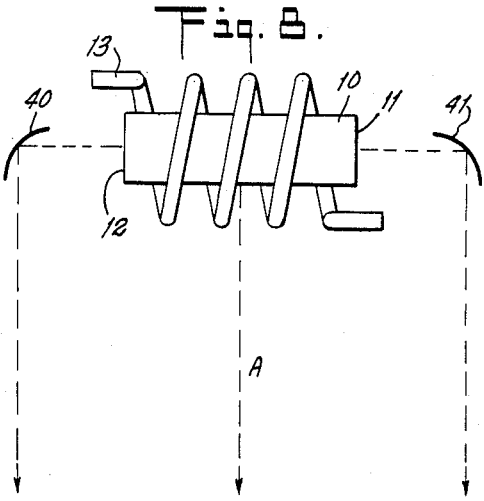
INVENTORS
CHARLES J. KOESTER
ELIAS SNITZER
BY
ATTORNEY Jan. 18, 1966  C. J. KOESTER ETAL  3,230,475
STRUCTURE FOR INCREASING LIGHT INTENSITY
AT A DISTANT POINT
Filed July 10, 1962  3 Sheets-Sheet 3
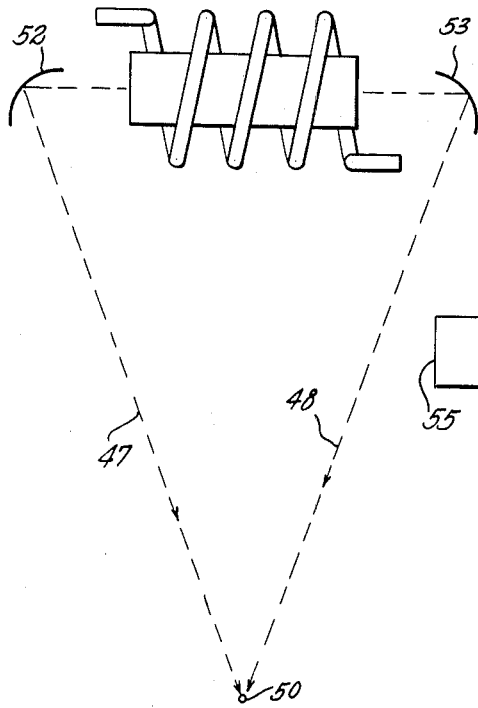
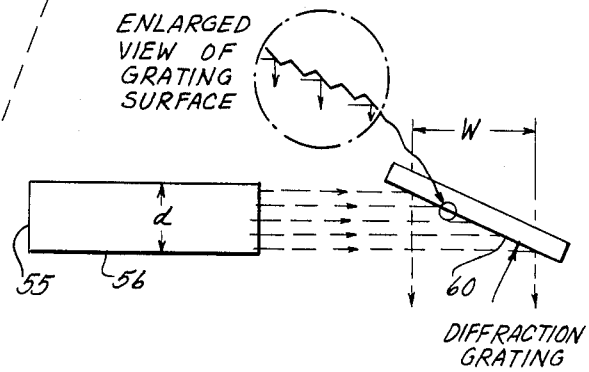
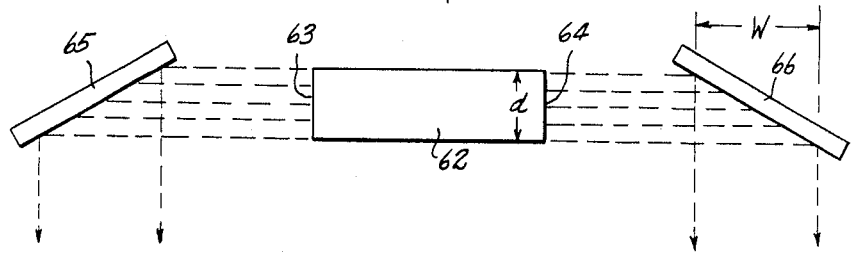
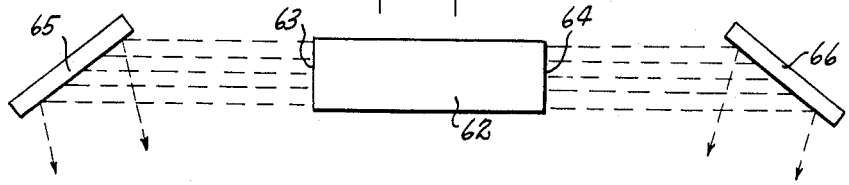
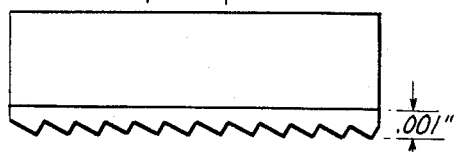
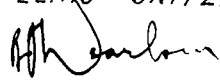
INVENTORS
CHARLES J. KOESTER
ELIAS SNITZER
BY
ATTORNEY United States Patent Office 3,230,475
Patented Jan. 18, 1966

This invention pertains to directional devices for lasers, and one object of the invention is to provide means for directing the laser energy in a narrow beam of a well defined direction and for greatly increasing the intensity of the beam by employing interference effects.

The light output from a laser is highly monochromatic, and consequently interference effects can be produced even when the path difference between the interfering beams is large.

Another object of the invention is to greatly increase the radiant intensity of the light from a laser so as to make it particularly well adapted for signalling over large distances.

A further related object of the invention is to largely increase the power per unit solid angle, the radiant intensity in the radiation pattern.

Other objects and advantages of the invention will be apparent from the more detailed description which follows:

Referring to the drawings:

FIG. 1 is a diagrammatic illustration of a laser in the form of a Fabry-Perot interferometer, with a plane wave emerging from each of its ends.

FIG. 2 shows the radiation pattern at infinity. The dashed curve gives the radiation pattern which exists if the mirrors of FIG. 1 were not employed, and the solid curve indicates the redistribution of light which is effected by the use of the mirrors.

FIG. 3 corresponds to FIG. 1 but employs beam splitters.

FIG. 4 is similar to FIG. 3, but with one end of the laser supplied with a reflector and the other end arranged for partial reflection and partial transmission. In other words, in this figure a beam extends only from one end of the laser instead of one from each of its ends, as in FIG. 1.

FIG. 5 corresponds to FIG. 2 and shows the radiation pattern at infinity for the arrangement of FIG. 4.

FIG. 6 corresponds to FIG. 4 except that there are several beam splitters.

FIG. 7 shows the resulting radiation pattern at infinity.

FIG. 8 corresponds to FIG. 1 except that slightly concave mirrors are substituted for the plane mirrors.

FIG. 9 corresponds to FIG. 1 except that the mirrors are set at such angles as to cause the beams to converge to a point at a predetermined finite distance instead of meeting at infinity.

FIG. 10 corresponds to FIG. 9 except that the slightly concave mirrors are substituted for the plane mirrors of FIG. 9.

FIG. 11 shows a laser with beams emitting only at one end and a diffraction grating used to produce by diffraction first order beams which are substantially parallel.

FIG. 12 corresponds to FIG. 11, but the beams are emitted from the laser at both ends and diffraction gratings are spaced from the respective ends at such angles as to produce parallel beams.

FIG. 13 corresponds to FIG. 12 except that the diffraction gratings are set at such angles as to produce beams converging to a point at a predetermined finite distance.

FIG. 14 shows a cross section on a greatly enlarged scale of a special grating adapted to minimize the loss due to light which is diffracted into other orders.

Referring to FIGS. 1 and 2, the laser 10 for purposes of illustration, may be a cylindrical piece of lasering material with both ends ground and polished to be closely parallel to one another and partially silvered at 11 and 12. Then if the material is caused to laser by the use of a conventional helical lamp 13, which surrounds the cylinder 10, the light issuing from the two ends will consist of a continuation of plane waves corresponding to the many high Q modes of the Fabry-Perot interferometer. The portion of the light emerging under the most parallel conditions will be that from a single high Q mode nearly normal to the aperture. Even this portion of a plane wave of the diameter of the aperture will spread according to the diffraction limit set by the aperture. This angle of spreading for a cylindrical aperture is approximately $\theta = 1.22\lambda/D$ where $\lambda$ is the wavelength of the light and D is the diameter of the aperture.

By the use of this invention, it is possible to increase the effective aperture of a laser to produce a higher beam intensity, i.e. to direct the energy of the laser into a narrower angular beam, than if the laser is used alone.

In FIG. 1, S is the distance between two high reflection mirrors 14 and 15, and in this arrangement, as above explained, the laser has two partially silvered mirror faces, one on each end.

The light in any one mode is coherent as it emerges from both ends. By reflecting it from the mirrors as shown, the two beams will interfere at large distances. For mirrors having reflective surfaces oriented at 45° to the axis of the laser element 10 as shown, on the axis A the intensity is higher than would be obtained with only one mirror or by using the laser alone. The first minimum will be at approximately an angle of $\theta' = \lambda/2S$, where S is the separation between the two mirrors.

Although the overall spreading of the beam is not changed by this arrangement, the light is redistributed so that over narrow angular regions the intensity is significantly higher than with the laser used alone. The radiation pattern at infinity, as shown in FIG. 2, is such that the maximum radiant intensity is much greater than that obtainable without the use of mirrors. The arrangement of FIG. 1 has a maximum intensity four times that of the beam emerging from one end of the laser.

Referring to FIG. 3, beam splitters 18 and 19 are introduced between the reflection mirrors 11 and 12 and redistribute the light so that the peaks of the curve are narrower and radiant intensity is greater, as hereinafter explained.

FIG. 4 corresponds substantially to the arrangement of FIG. 3 except that the laser has one end 20 fully silvered, or otherwise formed with a complete reflector, and the other end 21 partially silvered so that it permits the beam to travel outward. Thus all of the output energy emerges from end 21. It is then split into two parallel beams by beam splitter 22 and mirror 23. The intensity in this case is equal to that of the FIG. 1 arrangement. The radiation pattern for this arrangement is shown in FIG. 5.

Referring to FIG. 6, if $n$ evenly-spaced beam splitters 25 and one mirror 26 are used (in the drawing three splitters are shown), each reflecting the same quantity of light, the radiation pattern will be as shown in solid lines in FIG. 7, and the peak intensity in this case is $n$ times that obtained with only one mirror.

While in FIGS. 1, 3, 4 and 6 the beam splitters are shown set at 45° angles to the laser beam, this not essential, and in FIG. 1, for example, the mirror on one end might be set at 35° and the one on the opposite end at 55°. The sum of the angles then equals 90° so that the reflected beams from the two mirrors will be substantially parallel and only interfere at a great distance. In FIG. 6 the beam splitter and the mirror are parallel to each other but not necessarily at 45° to the laser beam.

In all cases the laser must be caused to lasser by using either the helical lamp of FIG. 1 or some other suitable well known means not shown.

By the substitution of slightly concave mirrors 40 and 41 for the plane mirrors 14 and 15 of FIG. 1, as shown in FIG. 8, it is possible further to narrow the beams produced by the collimation effects of the concave mirrors. Corresponding elements in FIG. 8 are designated by the same reference characters as in FIG. 1.

Likewise concave mirrors may be substituted for plane mirrors in the structures of FIGS. 3, 4, and 6.

While in FIGS. 1, 3, 4, 6 and 8 the beams reflected from the mirrors are substantially parallel and therefore only meet at infinity, in certain cases it may be desired to have the beams converge to a fixed point at a predetermined finite distance, and if so, the mirrors 45 and 46 are set at such angles, as shown in FIG. 9, that the beams from the lasser are reflected in paths shown by broken lines 47 and 48 and meet at a point 50 at a predetermined finite distance from the laser.

As shown in FIG. 10, slightly concave mirrors 52 and 53 may be substituted for the plane mirrors 45 and 46, for the purpose of focusing the reflected beams.

Referring to FIG. 11, one end 55 of the laser 56 is fully silvered and a diffraction grating 60 is located at the other end of the lasser and is set at such an angle to the beams emitted from the adjacent end of the laser as to produce by diffraction first order beams which are substantially parallel.

The formation of the diffraction grating is sawtoothed as shown in FIG. 11 in the offset detail drawing designated, "Enlarged View of Grating Surface."

The monochromatic light diffracted from the grating will form a radiation pattern characteristic of the projected width $w$ of the grating. By making the grating width greater than the laser diameter, this pattern can be made narrower than that due to the diameter $d$ of the laser itself. For example, for a grating of width $w=2''$ and a laser with a width $d=\frac{1}{8}''$ the pattern will be narrowed by a factor of 16. The ratio of radiant intensities may be less than 16 to 1 due to light which is diffracted into second and third or other orders. However, this loss can be minimized by forming the grating as shown on a greatly enlarged scale in FIG. 14.

The special grating here shown has a sawtooth appearance when enlarged and has alternately longer steps at a small angle to the body of the grating and shorter steps at a large angle. In this way most of the light from the laser beam is diffracted into the desired first order.

The grating may consist of a glass plate with an extremely thin coating of aluminum in which the sawtooth cuts are formed.

In FIG. 12, the laser 62, having its ends 63 and 64 partially silvered mirror faces, produces beams which are emitted from each end, and diffraction gratings 65 and 66 are located at the respective ends and are set at such angles that the beams produced by diffraction are parallel. In this way the interference effect of FIG. 1 is combined with the action of the diffraction gratings so as to secure the advantages of both.

The gratings may, if desired, be set at such angles that the diffracted beams, instead of being substantially parallel, will converge so as to meet at a point at a predetermined finite distance from the laser, thus corresponding to FIGS. 9 and 10.

The principles of this invention have been illustrated and described by the best embodiments now known to the applicants, but only such limitations should be imposed as are indicated in the appended claims.

We claim:

1. A structure for increasing light intensity at a distant point comprising a laser exhibiting a finite aperture for emitting at least one essentially monochromatic and essentially time-coherent beam of laser energy, and spaced laser-energy reflective surfaces positioned in said beam and at an angle thereto for reflecting the laser beam energy in at least two spaced and substantially parallel monochromatic and time-coherent beams of energy to create at a distant point an interference pattern in which the maximum intensity is substantially increased in comparison with that of the laser-emitted beam only, considered at said distant point.

2. A structure for increasing light intensity at a distant point comprising an elongated laser having at least partially reflective end surfaces providing a form of Fabry-Perot interferometer for emitting at least one essentially monochromatic and essentially time-coherent beam of laser energy, and spaced laser-energy reflective surfaces positioned in said beam and at an angle thereto for reflecting the laser beam energy in at least two spaced and substantially parallel monochromatic and time-coherent beams of energy to create at a distant point an interference pattern in which the maximum intensity is substantially increased in comparison with that of the laser-emitted beam only, considered at said distant point.

3. A structure for increasing light intensity at a distant point comprising a laser exhibiting a finite aperture for emitting at least one essentially monochromatic and essentially time-coherent beam of energy, and a reflective diffraction grating spaced from an end of said element to provide laser-energy reflective surfaces position in said beam and at an angle thereto for reflecting the laser beam energy thereof in multiple spaced and substantially parallel monochromatic and time-coherent beams of energy to create at a distant point an interference pattern in which the maximum intensity is substantially increased in comparison with that of the laser-emitted beam only, considered at said distant point.

4. A structure for increasing light intensity at a distant point comprising a laser having end surfaces each exhibiting a finite aperture for emitting a pair of oppositely directed essentially monochromatic and essentially time-coherent beams of laser energy, and at least two reflectors spaced in opposing relation to individual ones of said end surfaces and in said oppositely directed beams at an angle so as to reflect the laser beam energy in at least two spaced and substantially parallel monochromatic and time-coherent beams of energy to create at a distant point an interference pattern in which the maximum intensity is substantially increased in comparsion with that of the laser-emitted beam only, considered at said distant point.

5. The laser structure of claim 3 in which opposed ends of the laser emit a pair of oppositely directed beams of said essentially monochromatic and essentially time-coherent energy, and in which reflective diffraction gratings are positioned in spaced opposing relation to said ends of said laser and in said oppositely directed beams so as to reflect the laser beam energy of both laser beams as multiple spaced and substantially parallel monochromatic and time-coherent beams of energy to create said interference pattern at said distant point.

6. The laser structure of claim 4 in which said reflectors are planar mirrors having planar surfaces oriented at 90° to one another.

7. The laser structure of claim 4 in which said reflectors are each comprised by a mirror having a concave mirror surface.

8. The combination of a laser for producing a pair of oppositely directed coherent output beams and including partially reflective end surfaces providing a form of Fabry-Perot interferometer structure, and reflective elements providing additional reflective surfaces spaced from the respective ends of the laser and set at such an angle relative to said output beams and at 90° angles to each other that said additional reflective surfaces reflect said output beams to produce at least one pair of substantially parallel coherent beams; whereby each said pair of substantially parallel coherent beams produces, at a distant receiving point, a radiation pattern due to interference effects having an intensity maximum at least approximately double that of the laser alone.

9. The combination of a laser, having end reflectors forming a Fabry-Perot interferometer structure, for emitting a coherent plane wave from one end thereof with a plurality of mirrors spaced from said one end in position to intercept said plane wave, said plurality of mirrors being parallel to one another and at an angle to said plane wave, each of said plurality of mirrors which is located intermediate said one end and the outermost mirror being formed to constitute a beam splitter; whereby a plurality of coherent and substantially parallel beams of substantially equal intensity are formed and the light, with respect to a distant receiving point, is redistributed by interference effects to form a radiation pattern having at least double the maximum intensity at said point as that of the radiation pattern without said plurality of mirrors.

10. The combination of a laser, having end reflectors forming a Fabry-Perot interferometer structure, for emitting oppositely directed coherent plane waves from opposed ends thereof, with two groups of plural mirrors substantially symmetrically spaced within a group and spaced by groups from each of said end reflectors in a position to intercept a plane wave from each said end, the mirrors in each group having substantially parallel reflective surfaces oriented at an angle to the plane wave intercepted thereby and the mirrors in one group having reflective surfaces oriented approximately 90° to the reflective surfaces of the mirrors in the other group thereof, those mirrors in each group which are located intermediate an end mirror of the group and the adjacent end reflector being formed to constitute beam splitters; whereby a plurality of coherent and substantially parallel beams of substantially equal intensity are formed and the light, with respect to a distant receiving point, is redistributed by interference effects to form a radiation pattern having at least double the maximum intensity at said point as that of the radiation pattern without said plurality of mirrors.

11. The combination of a laser having two partially reflecting mirror faces, one on each end, forming a Fabry-Perot interferometer for emitting a pair of oppositely directed coherent output beams, with spaced reflectors adjacent each end and positioned in said beams with reflective surfaces oriented to produce substantially parallel beams at an angle which is fixed with respect to said output beams and which will interfere to produce at a distant reception point a radiation pattern having a maximum intensity substantially greater than that of the laser alone.

References Cited by the Examiner

Collins et al.: "Coherence Narrowing, Directionality, and Relaxation Oscillations in the Light Emission from Ruby" Physical Review Letters, vol. 5, No. 7, Oct. 1, 1960, pp. 303–305.

Connes: "Spectrometre Interferential a Selection Par l'Amplitude Demodulation," Le Journal de Physique et le Radium, vol. 19, No. 3, March 1958, pp. 215–222.

Jenkins et al.: Fundamentals of Optics, Jenkins and White, second ed., 1950, McGraw-Hill, New York.

Masters: "Coupling of Laser Rods," Proceedings of the IRE, vol. 50, No. 2, February 1962, pp. 220–221.

Nelson et al.: "Spatial Coherence in the Output of an Optical Maser," Journal of Applied Physics, vol. 32, No. 4, April 1961, pp. 739–740.

Walsh et al.: "The Interference Between Beams from the Opposite Ends of a Ruby Optical Maser," Applied Optics, vol. 1, No. 1, January 1962, pp. 45–49.

JEWELL H. PEDERSEN, *Primary Examiner.*

FREDERICK M. STRADER, *Examiner.*